United States Patent

Bour et al.

Patent Number: 5,835,547
Date of Patent: Nov. 10, 1998

[54] METHOD AND APPARATUS FOR INSPECTING THE RODS OF A NUCLEAR REACTOR CONTROL CLUSTER

[75] Inventors: Denis Bour, Lyons; Jérôme Pigelet, Châlons-sur-Saône, both of France

[73] Assignees: Framatome, Courbevoie; Compagnie Generale des Matieres Nucleaires, Velizy-Villacoublay, both of France

[21] Appl. No.: 894,732
[22] PCT Filed: Dec. 24, 1996
[86] PCT No.: PCT/FR96/02078
§ 371 Date: Aug. 27, 1997
§ 102(e) Date: Aug. 27, 1997
[87] PCT Pub. No.: WO97/24730
PCT Pub. Date: Jul. 20, 1997

[30] Foreign Application Priority Data

Dec. 29, 1995 [FR] France .................................. 95 15738

[51] Int. Cl.$^6$ ...................................................... G21C 17/00
[52] U.S. Cl. ........................ 376/248; 376/245; 376/249; 376/252
[58] Field of Search ...................... 376/245, 248, 376/249, 252, 450; 73/622, 625, 627, 629

[56] References Cited

U.S. PATENT DOCUMENTS 4,741,878 5/1988 Gebelin et al. .......................... 376/248
5,145,637 9/1992 Richardson et al. ..................... 376/248

FOREIGN PATENT DOCUMENTS 0 213 028 3/1987 European Pat. Off. .
0 410 580 1/1991 European Pat. Off. .

OTHER PUBLICATIONS

Patent Abstracts of Japan, vol. 002, No. 044 (M–013), 24 Mar. 1978, and JP 53 000394 A (Toshiba Corp), 5 Jan. 1978, voir abrégé.

*Primary Examiner*—Charles Jordan
*Assistant Examiner*—M. J. Lattig

[57] ABSTRACT

The apparatus for inspecting the rods of a cluster insertable in the core of a nuclear reactor comprises a body provided with sliding guide means for rods in m different orientations of the cluster, m being a submultiple of the number n of rods in the cluster, and a measurement jig carrying n/m heads (16) for eddy current examination and n/m probes (18) for ultrasound scanning placed on different guide paths. Each ultrasound probe (18) is constituted by an annular support surrounding a rod path and carrying a ring of individual transducers. The transducers are connected to a circuit for sequentially exciting the transducers in successive groups, causing the tube to be scanned circumferentially, and for electronic focusing towards the surface of a tube travelling on the path.

13 Claims, 3 Drawing Sheets

FIG.1.
FIG.2.
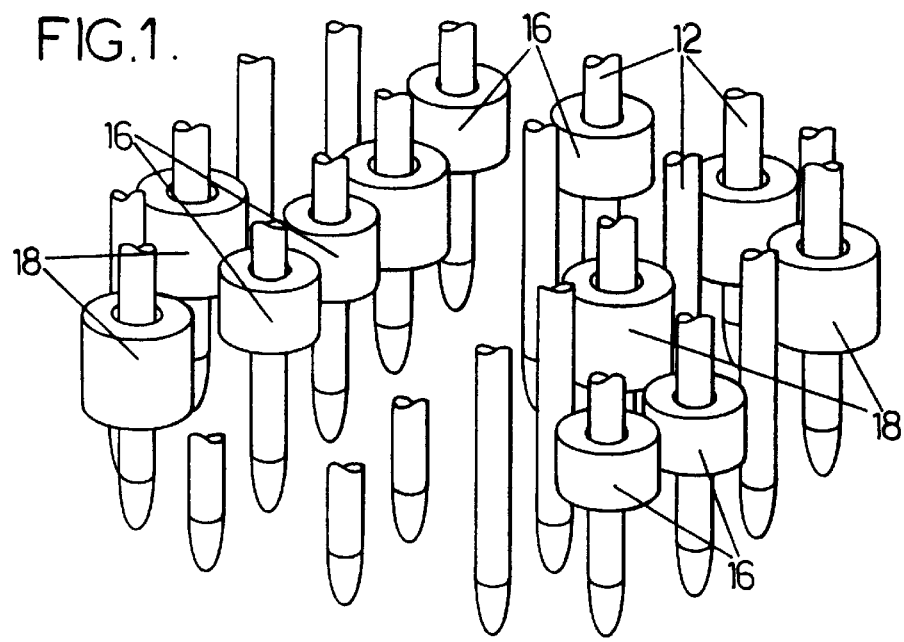
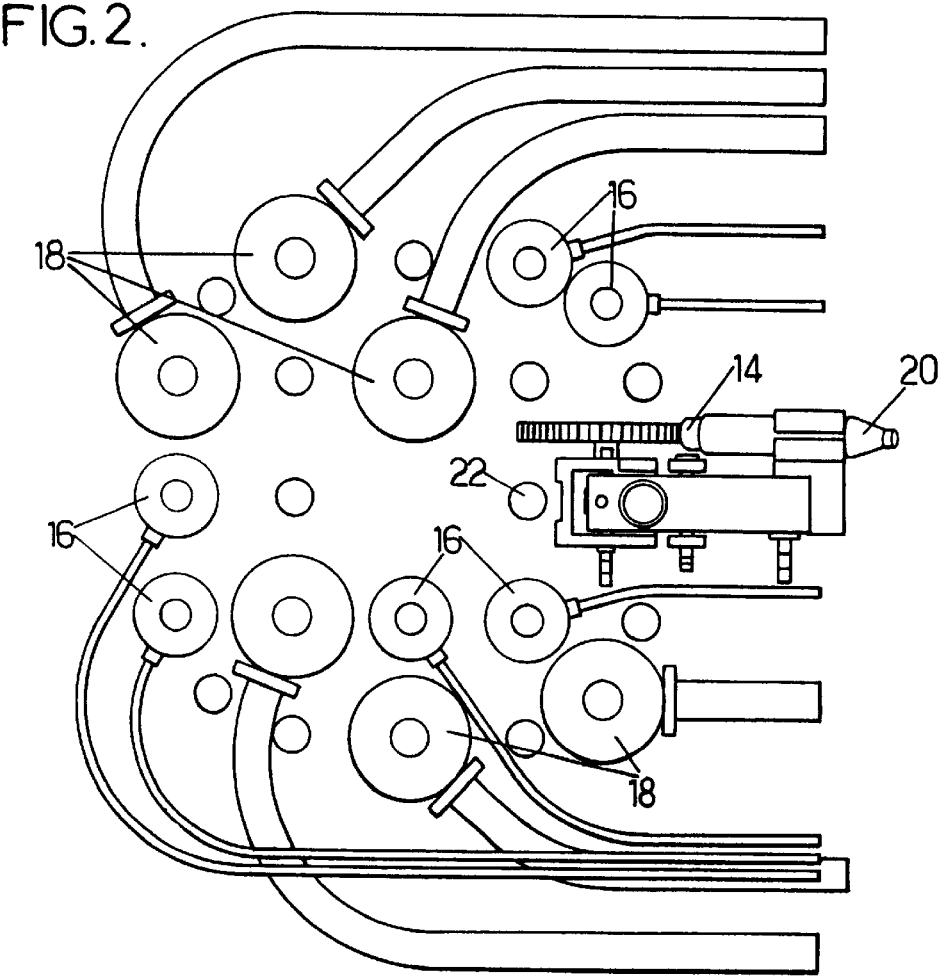

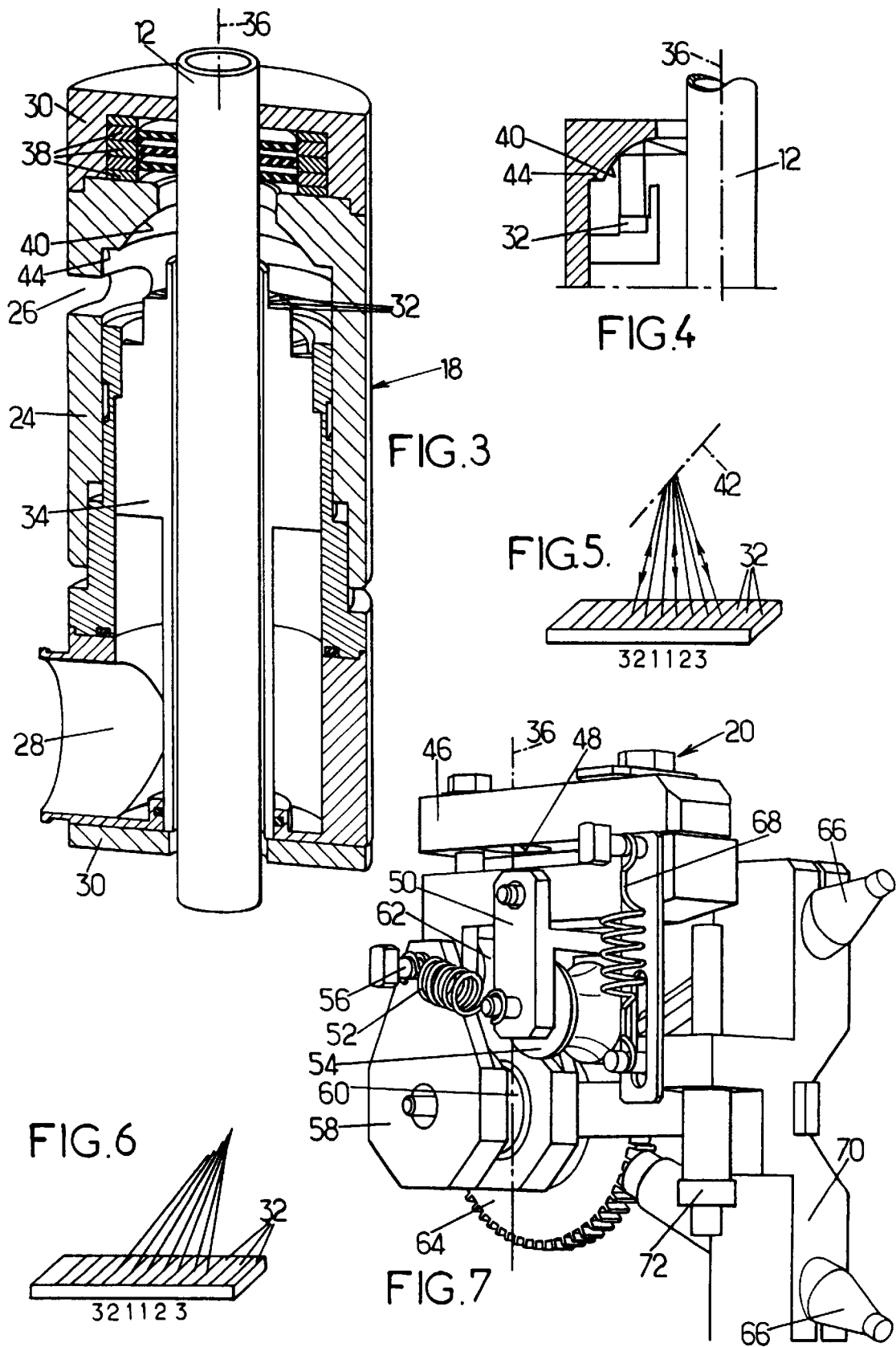

METHOD AND APPARATUS FOR INSPECTING THE RODS OF A NUCLEAR REACTOR CONTROL CLUSTER

BACKGROUND OF THE INVENTION

The present invention relates to inspecting the rods of clusters suitable for insertion in the core of a nuclear reactor, and it relates more particularly to a method and to apparatus for eddy current and ultrasound inspection, enabling the wear of the rods to be determined.

A major application of the invention lies in inspecting rods constituted by cladding containing an absorbent material and belonging to the reactivity-adjusting clusters insertable into the fuel assemblies of reactors that are cooled and moderated by light water. In such reactors, adjustment clusters are used, each constituted by a bundle of absorbent rods, e.g. twenty-four such rods, carried by the arms of an upper handling part known as a "spider".

Periodically, it is necessary to verify the state of the rods to discover faults therein in order to detect sufficiently early any risk of the cladding becoming pierced or of the rod jamming because of swelling.

A method of inspecting rods has already been proposed (FR-A-2 585 869) in which the rods and an examination assembly are moved longitudinally relative to one another. In a first step, the cluster is lowered through an inspection assembly and a plurality of rods are inspected simultaneously by eddy currents. During a second step, doubtful rods are verified one by one by ultrasound probing, over the axial lengths thereof found to be doubtful and over various different profiles. Only one ultrasound sensor is provided. It can be rotated about a rod while the rod is simultaneously being displaced longitudinally.

That method has advantages over the previously known solutions. It makes it possible to perform ultrasound probing only on rods that have already been recognized as being doubtful during eddy current inspection, which can be performed with means that are much more simple. However, it does not provide full information concerning the type of defect to which the cladding of the rods has been subjected at all longitudinal levels thereof. Unfortunately, the number of defects can vary very considerably from one cluster to another. In the case of control clusters used in present-day pressurized water nuclear reactors, wear at different levels can be in the form of a bullet shape, a balloon, a flat, etc. It is also possible for the cladding to swell.

SUMMARY OF THE INVENTION

The invention seeks to provide a method and apparatus making it possible to obtain full information, and to do so without having any significant influence on the duration of inspection.

To this end, the invention provides a method of inspecting the rods of a cluster insertable in the core of a reactor, in which the rods and an inspection assembly that provides a measurement signal are displaced longitudinally relative to each other, the method being characterized in that:

a) the cluster, comprising $n$ rods is displaced through an inspection assembly whereby eddy current inspections are performed on n/m rods simultaneously, where $m$ is an integer submultiple of $n$, and simultaneously the echoes obtained by electronically scanned ultrasound probing over the entire periphery of n/m rods simultaneously are recorded at successive longitudinal levels;

b) operation a) is performed $m$ times, after rotating the cluster on each occasion through an angle of 360°/m; and c) the recordings of the ultrasound echo results are analyzed at least over those axial lengths of the rods found to be doubtful by the eddy current inspection.

Eddy current analysis serves to provide an overall measure of the degree of external wear of the rods. Ultrasound operation serves in addition to locate the places where matter is missing or swollen. Detailed analysis, which constitutes a complex operation, need be performed only on small zones and can be performed in differed time. It therefore does not lead to the inspection apparatus being tied up for a greater length of time.

In an advantageous implementation, the elevation of the rod while the cluster is moving is measured, and electronically scanned ultrasound exploration is performed at successive levels each time over a period of time that is at least an order of magnitude shorter than the time interval between two measurements at different levels. Results are thus made available, with each result corresponding substantially to a single level.

Analysis can provide a curve representative of the periphery of doubtful zones; it may include computation and display (or recording) of wear in a profile that is longitudinal or transversal. The analysis may also include computation of the thickness of matter lost at the site of the wear, in a given longitudinal or transversal profile.

Each scan can be performed in a very short period of time because of the scanning is electronic, which is much quicker than mechanical scanning and therefore takes place at a level that is substantially constant.

As a general rule, ultrasound scanning is performed by simultaneously exciting a plurality of probe transducers in association with electronic focusing performed in conventional manner by applying delays to the excitation pulses for the transducers closest to the chosen focus point. Such electronic focusing is in addition to that obtained naturally because of the annular disposition of the transducers around the rod. Focusing in the longitudinal direction can be provided by means of a toroidal mirror, or by means of a lens, or indeed by using unit transducers that are curved. It can also be performed electronically by placing a plurality of transducer rings that are spaced apart in the longitudinal direction.

The invention also provides apparatus for inspecting the rods of a cluster of rods insertable into the core of a nuclear reactor, the apparatus comprising a body provided with means for slidably guiding the rods in $m$ different orientations of the cluster, where $m$ is an integer submultiple of the number $n$ rods in the cluster, and a measurement jig carrying n/m coils for eddy current inspection and n/m ultrasound probes placed on different guide paths, the apparatus being characterized in that each ultrasound probe is constituted by an annular support surrounding the path of a rod and carrying a ring of unit transducers, and in that the transducers are connected to a circuit for sequentially exciting the transducers in successive groups so as to give rise to circumferential scanning around the path of the rod and to electronic focusing onto the surface of a tube travelling along the path.

In an advantageous embodiment of the invention, the transducers are placed so as to emit in a direction that is not radial relative to the path of the tube, and indeed which is advantageously parallel to said path, and a mirror is interposed between the transducers and the tube to reflect the ultrasound towards the tube and optionally to focus it on the nominal periphery of the tube.

The sequential excitation circuit may be designed so as to enable the beam to be steered at will, either in a direction for examining a rod, or else towards a rectroreflector for enabling the speed of ultrasound propagation in the medium between the transducers of the rod to be determined by measuring the go-and-return time of the ultrasound.

The above characteristics and others appear more clearly on reading the following description of a particular embodiment, given by way of non-limiting example.

BRIEF DESCRIPTION OF THE DRAWINGS

FIG. 1 is a theoretical diagram in perspective showing one possible distribution of eddy current inspection coils and of ultrasound probes in inspection apparatus;

FIG. 2 is a plan view showing n/m=6 eddy current coils and n/m=6 ultrasound probes distributed over a measurement jig which also carries an elevation sensor;

FIG. 3 is a longitudinal section view showing one possible structure for an ultrasound probe;

FIG. 4 is a detail diagram showing an "optical" method of focusing, the diagram being in section on a plane containing the axis of the path on which a rod travels;

FIGS. 5 and 6 are diagrams respectively showing electronic focusing on a rod and on a mirror for enabling the speed of the ultrasound to be measured;

FIG. 7 is a perspective view of a suitable elevation sensor;

DETAILED DESCRIPTION OF THE PREFERRED EMBODIMENT

Figure 8:
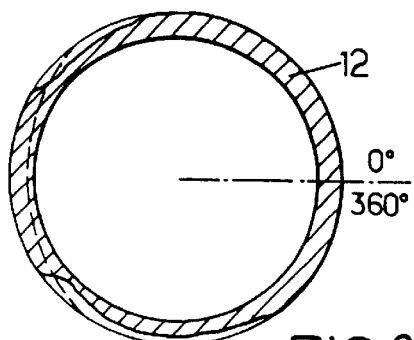
FIG. 8 shows "double-V" type wear of a rod.

The overall architecture of the inspection apparatus may be similar to that of the apparatus described in document No. FR-A-2 585 869 to which reference may be made. The apparatus is designed to examine control clusters comprising twenty-four absorbent rods 12 (FIG. 1) each terminated by a bullet shape to facilitate insertion thereof in an assembly guide tube. The inspection apparatus is generally located in the fuel building adjacent to the nuclear reactor enclosure.

The mechanical portion of the apparatus may be similar to that described in document FR-A-2 585 869. It comprises a body that gives protection, and that is provided with guide tubes for the rods of the cluster and with a horizontal plate or jig carrying the detectors of the apparatus. This mechanical portion is placed in a pool.

The jig may be constituted by a plate 14 (FIG. 2) having six eddy current examination heads 16 and six ultrasound scanning probes 18 fixed thereon. FIG. 2 shows one possible distribution for the heads and the probes. The plate 14 also carries a sensor 20 for sensing the elevation of the rods 12. In order to enable the sensor to be at substantially the same level as the probes and the heads, it measures the elevation of a rod that is not being subjected to examination but that is guided by one of the through holes 22 for rods in the plate.

The eddy current examination heads may be of conventional type, each comprising a coil surrounding the rod and powered at high frequency. Nevertheless, it is more advantageous for them to have the structure described in French application serial number 95 15737 entitled "A method and apparatus for inspecting tubes by eddy currents". Under such circumstances, the location of the tube under analysis within the head is also subjected to a continuous magnetic field for saturating the surface layer of the tube.

The number of heads, i.e. six, is not limiting and it is possible, for example, to provide twelve heads and twelve probes, for a cluster having twenty-four rods and symmetry of order four or two.

Each ultrasound probe may have the structure shown in FIG. 3. It then comprises a housing comprising a plurality of assembled-together parts and a ring of individual piezoelectric transducers. The housing may be considered as having a tubular body 24 with water flow holes 26 formed therein, an endpiece 28 for outlet of coaxial cables that power the transducers, and at the ends of the body, guide plates 30 designed to center the tube under examination within the ring of transducers.

In the top guide plate 30, there are mounted a stack of centering brushes 38, each comprising, for example, a washer of flexible plastics material whose outer periphery is engaged in a block of greater thickness.

The ring of transducers is constituted by an array of individual transducers 32 (usually piezoelectric elements) mounted on a tubular support 34 and each connected to a conductor (not shown). In the embodiment shown, the transducers 32 are disposed in such a manner as to emit an ultrasound beam in a direction parallel to the axis 36 of the travel path of the tube under examination.

An annular mirror 40 is provided on the inside face of the body 24, at the top thereof, to reflect the ultrasound beam emitted by the transducers towards the tube 12 and to return echoes towards the transducers.

In the case shown diagrammatically in FIG. 4, the mirror 40 is of a concave toroidal shape: its radius of curvature and its orientation are designed so that a beam emitted by a transducer is focused in the axial direction on the nominal outside surface of a rod under examination.

The transducers are connected by coaxial cables to an external circuit designed to perform electronic scanning and focusing. Electronic focusing is obtained by exciting a group of transducers (e.g. six in the example of FIG. 5) with delays that are selected so as to correspond to the various travel times between the transducers and the line 42 on which focusing is to be achieved (FIG. 5). On each scanning shot, the group of six transducers is offset so as to scan a zone that would be straight in the example shown in FIG. 5 (where the transducers lie in a common plane), but that is curved in the example of a probe shown in FIG. 3. The delays are chosen so as to cause electronic focusing to take place on the nominal outer surface of the rod 12.

In the example shown in FIG. 4, an auxiliary reflector 44 is provided on the body at a location such that an ultrasound beam emitted towards the reflector by a group of transducers 32 returns to the transducers of the probe. In the example shown in FIG. 4, this auxiliary reflector 44 is constituted by a flat surface orthogonal to the axis 36. By modifying the excitation delays for the transducers in the same group, it is possible to cause emission to take place no longer towards the tube to be examined via the mirror 40, but towards the auxiliary reflector 44, as shown in FIG. 6.

On reception, delays of the same type as those used on transmission are applied to the echoes, so as to reconstitute a single echo.

The go-and-return distance for ultrasound reflected on the auxiliary reflector 44 and the measured go-and-return time make it possible to compute the speed of the ultrasound in water and consequently to calibrate the apparatus and to deduce therefrom the diameter of the outer periphery of the tube 12, and thus the thickness of the tube, knowing the transit time.

The optical focusing shown in FIG. 4 can be replaced by focusing of any other kind, e.g. by using one of the structures described in French patent application No. 95/10560. It is also possible to use an annular lens that focuses in the axial direction or focusing transducers.

The elevation sensor 20 may have the structure shown in FIG. 7. It then comprises a frame made up of a plurality of assembled-together parts. One of these parts constitutes a flange 46 for fixing to the plate by clamping. It is pierced by a hole 48 through which a rod passes. The frame carries an H-shaped rocker 50 capable of rocking about an axis orthogonal to the axis 36 along which the rod travels. A spring 52, e.g. a helical spring 52, is tensioned between the axis of the presser wheel 54 which rotates on the rocker 50 and a hinge rod 56 of a measurement arm 58. A measurement wheel 60 rotates on said arm and the spring 52 keeps it pressed against the rod travelling along the path of axis 36. An additional guide wheel 62 may be provided and allowed to rotate freely on the rod 56.

Means for measuring rotation of the measurement wheel 60 and thus displacement of the rod comprise a toothed meter wheel 64 and two proximity detectors 66 for providing one pulse each time a tooth goes past them. A traction spring between the frame and a block 70 carrying the proximity detectors urges the block upwards. The position of the block 70 can be fixed by an adjustable abutment 72 making it possible to adjust the position from which rod displacement measurement begins.

Figure 11:
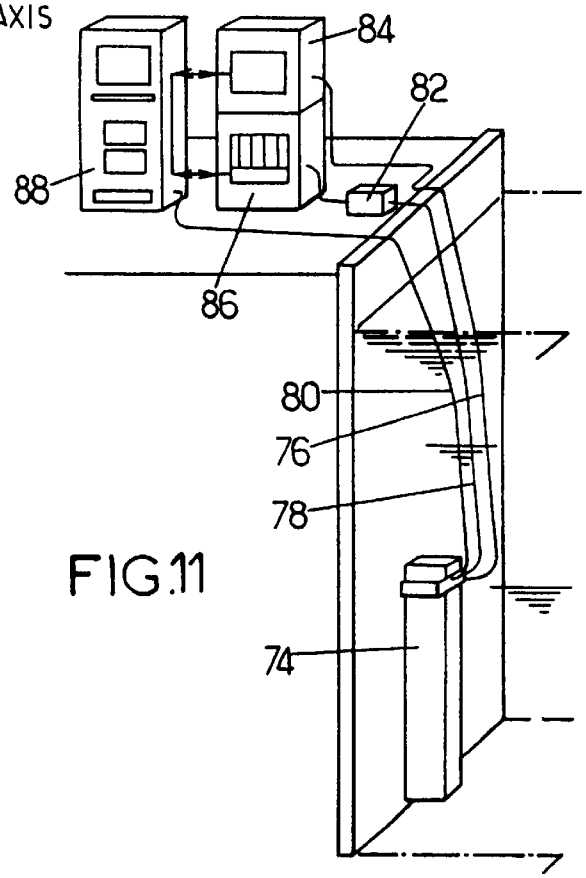
FIG. 11 is an overall diagram showing one possible disposition for the component parts of apparatus for inspecting a cluster located in a pool.

The various component elements of the apparatus may be distributed as shown diagrammatically in FIG. 11. The submerged equipment of the apparatus comprises a stand 74 to which the measurement jig belongs. The jig is connected to the control and operating racks located on the surface by a bundle of eddy current acquisition cables 76, a bundle of ultrasound acquisition cables 78, and a cable 80 providing a link with the elevation sensor. A multiplexer 82 is interposed on the bundle of ultrasound acquisition cables. The eddy current measurement rack 84 may be of structure that is conventional except that it is capable of operating at a plurality of different frequencies if it implements the method described in the above-mentioned French patent application. The ultrasound measurement rack 86 may be designed to implement a measurement sequence of the kind described below. Finally, the computer rack 88 controls the measurement racks and makes use of the results therefrom.

The measurement sequence for characterizing the rods of a cluster may be as follows.

In a first step, the ultrasound and eddy current acquisition systems are parameterized or calibrated. For example, the speed of sound in the water of the pool can be determined by measuring the go-and-return time when using the beam orientation shown in FIG. 6.

A measurement sequence is then performed. To simplify matters, only ultrasound acquisition is described.

Acquisition is performed on three or six rods simultaneously, performing circumferential scanning each time a code pulse is emitted as generated by the computer rack 88 at the end of each determined displacement step of the cluster, as measured by the elevation sensor. The values at each level are recorded. The computer rack makes it possible to trace curves showing the states of the rods at various levels and also other information deemed necessary. Finally, the cluster is extracted from the stand 74 and rotated through 90° to repeat the sequence.

The software loaded in the computer rack 88 may serve in particular:

to select a longitudinal profile on a rod;

to center the profile on the nominal displacement axis;

to determine the depths and the positions of surface defects; and to record results in a file.

The raw results supplied by ultrasound probing are in the form of a transit times. The radii of the rods are restored by software that processes these times, and that can be designed to compute the percentage of material missing along the full height.

By way of example, FIG. 8 has a solid line showing a type of wear that can be referred to as "double-V" wear which is caused by rubbing against the lips of a longitudinal slot of a cladding tube.

Figure 9:
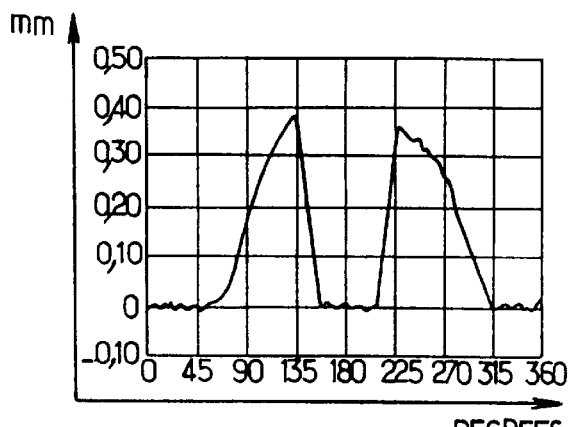
FIG. 9 is a graph representative of the signal obtained during circumferential scanning at the level shown in FIG. 8.

The measurement racks can then deliver a curve showing differences compared with the nominal radius over the entire periphery, as shown in FIG. 9.

Figure 10:
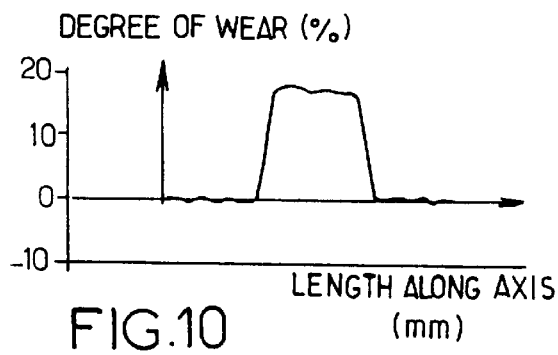
FIG. 10 shows a recording of wear in a longitudinal profile as can be supplied by the apparatus of the invention.

Using the measurements performed at a plurality of successive levels, it is possible to reconstitute along a given longitudinal profile the variation in wear rates, as shown in FIG. 10.

The invention thus makes it possible to determine the types of wear to which the rod has been subjected, which types may be very varied. For example, balloon-shaped wear may be observed of the kind indicated by dashed lines in FIG. 8 and provoked at certain levels by a sequence of vibrations leading to rubbing against the guide cards.

The invention can be implemented in numerous ways, in particular with respect to the structure of the probes. In particular, although the use of a mirror is advantageous since it reduces bulk in the horizontal direction, it is not essential, and focusing can be achieved by other means.

We claim:

1. A method of inspecting rods of a cluster of rods insertable in a core of a reactor, including the steps of:

(a) longitudinally moving the cluster, comprising n said rods, through an inspection assembly constructed to carry out eddy current inspections on n/m rods simultaneously, where m is an integer submultiple of n, and simultaneously recording ultrasound echoes obtained by electronically scanned ultrasound probing over the entire periphery of n/m said rods simultaneously at successive longitudinal levels;

(b) repeating step (a) m−1 times, each time after rotating the cluster through an angle of 360°/m; and (c) analyzing recordings of the ultrasound echoes at least over those axial lengths of the rods found to be doubtful by the eddy current inspection.

2. The method according to claim 1, wherein the analysis of step (c) is performed by drawing a curve representing a periphery of the rods.

3. A method according to claim 1, characterized in that the analysis includes computing and displaying or recording wear along all or a portion of the height of a rod on a single longitudinal profile of a rod or on successive cross-sections at given respective elevations.

4. A method according to claim 1, characterized in that the analysis includes computing the amount of material that is missing over a determined length of the rod along a determined longitudinal profile thereof.

5. A method according to claim 1, characterized in that rod elevation is continuously measured during cluster displacement and in that electronically scanned ultrasound probing is performed at successive levels, on each occasion in a period of time that is at least an order of magnitude smaller than the time interval between two measurements at different levels.

6. A method according to claim 1, characterized in that ultrasound scanning is performed by successively exciting groups of transducers with delays between excitations of the transducers within the group such that electronic focusing is achieved in the circumferential direction around the axis of the travel path of the rod.

7. A method according to claim 1, characterized in that eddy current examination is performed by subjecting the tubes simultaneously to the action of a surrounding coil that is fed at high frequency and to a continuous magnetic field of sufficient strength to saturate magnetically a thin surface layer.

8. An apparatus for inspecting rods of a cluster insertable into a core of a nuclear reactor, said apparatus comprising:

(a) a body having means for slidably guiding the rods in m different orientations of the cluster, where m is a submultiple of a total number n of rods in the cluster; and a measurement jig carrying n/m heads for eddy current examination and n/m probes for ultrasound scanning, the heads and the probes being placed on different guide paths;

(b) each of said ultrasound probes being constituted by an annular support surrounding a rod path and carrying a ring of individual transducers and said transducers being connected to a circuit for sequentially exciting the transducers in successive groups, causing the tube to be scanned circumferentially, and for performing electronic focusing towards the surface of one rod travelling along one of said paths.

9. Apparatus according to claim 8, characterized in that said circuit is designed to record the echoes received by the excited transducers and to perform focusing on reception by applying delays equal to the delays applied on emission.

10. Apparatus according to claim 8, characterized by an annular ultrasound-reflecting mirror (40) interposed between the ring of transducers (32) and the path of the tube, and coaxial with said path.

11. Apparatus according to claim 8, characterized in that said annular mirror (40) has a right cross-section and a location such that it focuses the ultrasound emitted by the transducers (32) on the outer periphery of a tube (12) of nominal diameter.

12. Apparatus according to claim 8, characterized in that it also includes a reflector (44) for reflecting ultrasound towards the transducers, and in that the circuit for sequential excitation and focusing is designed to direct an ultrasound beam at will from the transducers towards the reflector.

13. Apparatus according to claim 8, characterized in that said circuit belongs to measurement and computer racks programmed to cause a measurement acquisition sequence to be performed on n/m rods simultaneously by synchronization with code pulses generated by the vertical displacement of the cluster, for recording the measured values, for plotting curves showing the state of the rods, and to repeat the sequence during a further displacement after the cluster has been extracted and rotated.

* * * * *